(12) United States Patent
Liu et al.

(10) Patent No.: US 12,147,931 B1
(45) Date of Patent: Nov. 19, 2024

(54) LOGISTICAL TRANSPORT VERIFICATION OF OPERATIONAL FUNCTIONALITY

(71) Applicant: INTERNATIONAL BUSINESS MACHINES CORPORATION, Armonk, NY (US)

(72) Inventors: Su Liu, Austin, TX (US); Fang Lu, Billerica, MA (US); Logan Bailey, Atlanta, GA (US); Zachary A. Silverstein, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 18/336,322

(22) Filed: Jun. 16, 2023

(51) Int. Cl.
  *G06K 7/00* (2006.01)
  *G06Q 10/0832* (2023.01)
  *G07C 3/00* (2006.01)

(52) U.S. Cl.
  CPC .......... *G06Q 10/0832* (2013.01); *G07C 3/00* (2013.01)

(58) Field of Classification Search
  CPC ............. G06Q 10/0833; G06Q 10/08; G06Q 10/0832; G06Q 10/083; G07C 3/00; G07C 2009/00825
  USPC ................ 235/438, 380, 375, 384
  See application file for complete search history.

(56) References Cited

U.S. PATENT DOCUMENTS

| | | | |
|---|---|---|---|
| 8,239,927 | B2 | 8/2012 | Benaloh |
| 10,498,598 | B1* | 12/2019 | Sanchez ............. H04L 41/0846 |
| 2011/0173496 | A1 | 7/2011 | Hosek |
| 2017/0169264 | A1* | 6/2017 | Britt ..................... G06Q 10/087 |
| 2017/0171196 | A1 | 6/2017 | Britt |
| 2018/0220278 | A1* | 8/2018 | Tal ........................ H04L 9/3236 |
| 2019/0098089 | A1* | 3/2019 | Shim .................... H04L 67/565 |
| 2022/0040557 | A1 | 2/2022 | Tran |
| 2022/0086011 | A1* | 3/2022 | Siddiqui ................ G06Q 30/01 |
| 2022/0116384 | A1* | 4/2022 | Bartsch ................... G06F 21/72 |
| 2022/0239648 | A1* | 7/2022 | Ramachandran ... H04L 63/0876 |
| 2022/0337611 | A1* | 10/2022 | Brazao .................. G16Y 20/20 |

(Continued)

OTHER PUBLICATIONS

Ali et al., "Internet of Things Security, Device Authentication and Access Control: A Review," (IJCSIS) International Journal of Computer Science and Information Security, vol. 14, No. 8, Aug. 2016, ResearchGate, 12 pages.

(Continued)

*Primary Examiner* — Daniel St Cyr
(74) *Attorney, Agent, or Firm* — Tihon Poltavets

(57) ABSTRACT

Described is a method for logistic transport monitoring of an IoT device utilizing token generation for payload data for features and peripheral functionality associated with the IoT device being shipped between an origin location and a target location. The method include generating a pre-shipment token prior to loading of the IoT device onto a logistic transporter and regenerating a token subsequent to loading of the IoT device onto the logistic transporter, where a validated pre-shipment token and a matching regenerated token indicate a faultless operational status of the IoT device. The method includes iteratively regenerating tokens during the shipment of the IoT device, where a mismatch between an iteratively generated token and the regenerated token indicate an operational fault of the IoT device indicating the IoT device was damaged during the shipment between the origin location and the target location.

20 Claims, 3 Drawing Sheets

(56) References Cited

U.S. PATENT DOCUMENTS

2022/0383296 A1    12/2022  Gottschalk
2023/0098602 A1*    3/2023  Cella .................... B29C 64/386
                                                              700/248

OTHER PUBLICATIONS

Disclosed Anonymously, "A method for secure self registration of Devices/Gateways with an IoT Broker", IP.com, IP.com No. IPCOM000254281D, IP.com Publication Date: Jun. 18, 2018, 7 pages.

Disclosed Anonymously, "Optical Authentication System with Time Series QR Codes", IP.com, IP.com No. IPCOM000269698D, IP.com Publication Date: May 5, 2022, 5 pages.

Reddy et al., "Security for IOT Devices", IP.com, IP.com No. IPCOM000246103D, IP.com Publication Date: May 6, 2016, 7 pages.

Tschofenig et al., "Credential Management for Internet of Things Devices", IPSO Alliance, Dec. 2017, https://www.omaspecworks.org/wp-content/uploads/2018/03/IPSO-IoT-Credential-Management_Final.pdf, 17 pages.

* cited by examiner

LOGISTICAL TRANSPORT VERIFICATION OF OPERATIONAL FUNCTIONALITY

BACKGROUND

This disclosure relates generally to logistical transport of Internet of Things (IoT) devices, and in particular to verification of operational functionality during the logistical transport of IoT devices.

Logistics is a part of supply chain management that involves the movement of goods, services, and other related information from a point of origin to a point of consumption. Goods can include Internet of Things (IoT) devices representing physical electronic objects with embedded hardware and software for connecting and exchanging data with other devices and systems over a communications network. An example of IoT devices includes medical devices, such as a respirator machine, which include various componentry that require the machine be handled with care when being moved through a logistical network. External damage to IoT devices while being moved through the logistical network is typically identifiable through a visual inspection of the IoT devices. However, internal damage is typically more difficult to identify since most of the embedded hardware of the IoT device is not visible, where identification of internal damage occurs once the customer powers on and begins to utilize the IoT device. Furthermore, medical devices require specific calibration of the embedded hardware, which can be affected through various physical impacts and motions when moving through the logistical network.

SUMMARY

Embodiments in accordance with the present invention disclose a computer-implemented method for logistic transport monitoring of IoT devices, the computer-implemented method can validate a logistic device, an IoT device, and associated functionality of the IoT device, wherein the IoT device is being shipped between an origin location and a target location. The computer-implemented method can generate a pre-shipment token for the IoT device based on a first set of payload data for a plurality of features and peripheral functionality, wherein the pre-shipment token is validated and indicates a faultless operational status of the IoT device. The computer-implemented method can, responsive to establishing a connection between the IoT device and the logistic device, regenerate a token for the IoT device based on a second set of payload data to re-validate the plurality of features and peripheral functionality, wherein the regenerated token matches the pre-shipment token. The computer-implemented method can generate a plurality of tokens for the IoT device iteratively between an origin location and a target location. The computer-implemented method can, responsive to determining a first iteratively generated token from a plurality of iteratively generated tokens does not match the regenerated token, receive data from the logistic device for a period of time between the first iteratively generated token and a prior iteratively generated token that matched the regenerated token.

Embodiments in accordance with the present invention disclose a computer program product for logistic transport monitoring of IoT devices, the computer program product comprising one or more computer-readable storage media can include program instructions, stored on at least one of the one or more storage media, to validate a logistic device, an IoT device, and associated functionality of the IoT device, wherein the IoT device is being shipped between an origin location and a target location. The computer program product can include program instructions, stored on at least one of the one or more storage media, to generate a pre-shipment token for the IoT device based on a first set of payload data for a plurality of features and peripheral functionality, wherein the pre-shipment token is validated and indicates a faultless operational status of the IoT device. The computer program product can include program instructions, stored on at least one of the one or more storage media, responsive to establishing a connection between the IoT device and the logistic device, to regenerate a token for the IoT device based on a second set of payload data to re-validate the plurality of features and peripheral functionality, wherein the regenerated token matches the pre-shipment token. The computer program product can include program instructions, stored on at least one of the one or more storage media, to generate a plurality of tokens for the IoT device iteratively between the origin location and the target location. The computer program product can include program instructions, stored on at least one of the one or more storage media, responsive to determining a first iteratively generated token from a plurality of iteratively generated tokens does not match the regenerated token, to receive data from the logistic device for a period of time between the first iteratively generated token and a prior iteratively generated token that matched the regenerated token.

Embodiments in accordance with the present invention disclose a computer system for logistic transport monitoring of IoT devices, the computer system comprising one or more processors, one or more computer-readable memories and one or more computer-readable storage media can include program instructions, stored on at least one of the one or more storage media for execution by at least one of the one or more processors via at least one of the one or more memories, to validate a logistic device, an IoT device, and associated functionality of the IoT device, wherein the IoT device is being shipped between an origin location and a target location. The computer system can include program instructions, stored on at least one of the one or more storage media for execution by at least one of the one or more processors via at least one of the one or more memories, to a pre-shipment token for the IoT device based on a first set of payload data for a plurality of features and peripheral functionality, wherein the pre-shipment token is validated and indicates a faultless operational status of the IoT device. The computer system can include program instructions, stored on at least one of the one or more storage media for execution by at least one of the one or more processors via at least one of the one or more memories, responsive to establishing a connection between the IoT device and the logistic device, to regenerate a token for the IoT device based on a second set of payload data to re-validate the plurality of features and peripheral functionality, wherein the regenerated token matches the pre-shipment token. The computer system can include program instructions, stored on at least one of the one or more storage media for execution by at least one of the one or more processors via at least one of the one or more memories, to generate a plurality of tokens for the IoT device iteratively between the origin location and the target location. The computer system can include program instructions, stored on at least one of the one or more storage media for execution by at least one of the one or more processors via at least one of the one or more memories, responsive to determining a first iteratively generated token from a plurality of iteratively generated tokens does not match the regenerated token, to receive data from the logistic device for a period of time between the first iteratively generated token and a prior iteratively generated token that matched the regenerated token.

DETAILED DESCRIPTION

Figure 1:
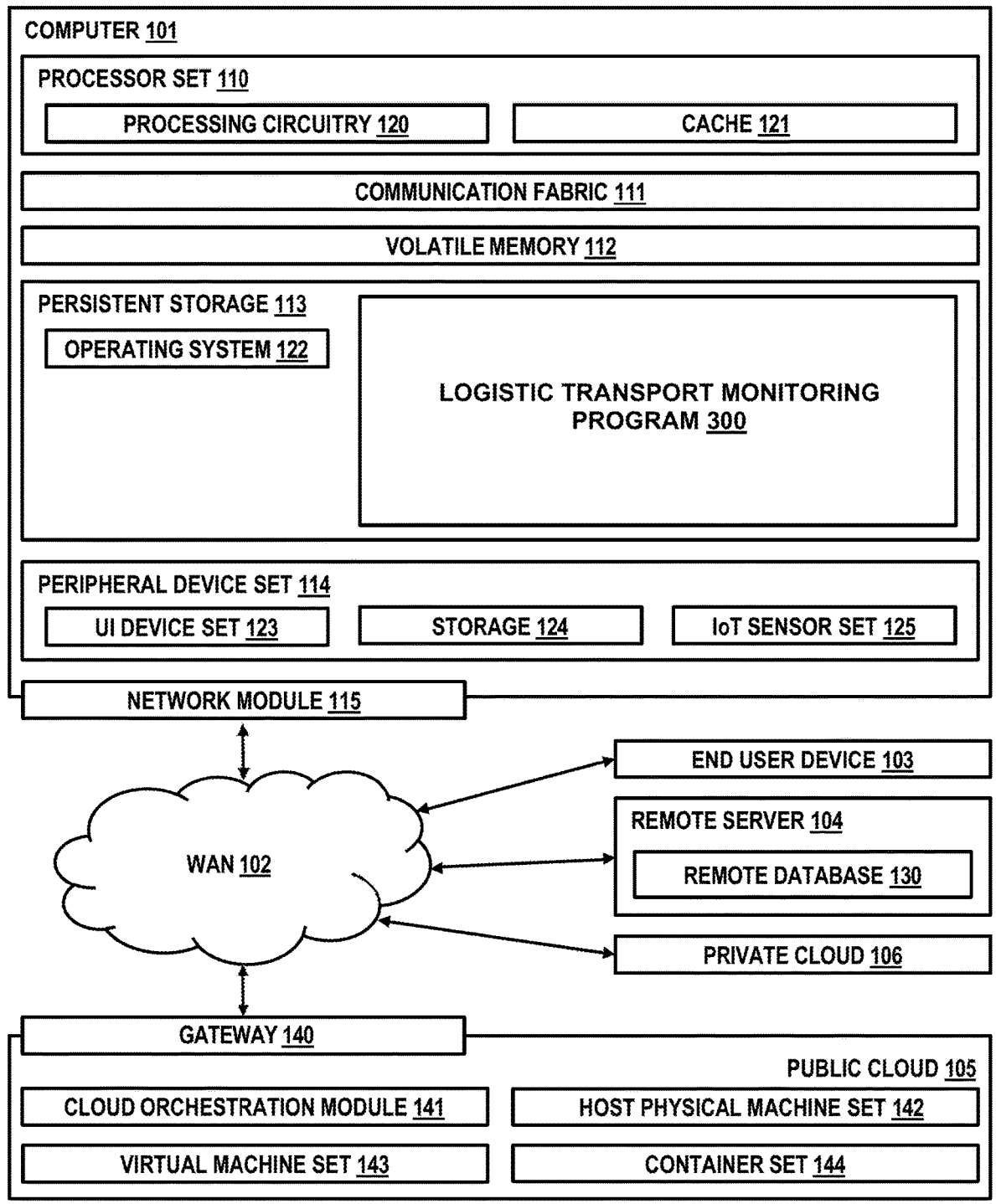
FIG. 1 is a functional block diagram illustrating a computing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

According to an aspect of the invention, provided is a computer-implemented method, computer program product, or a computer system for validating a logistic device, an IoT device, and associated functionality of the IoT device, where the IoT device is being shipped between an origin location and a target location. There is further generating a pre-shipment token for the IoT device based on a first set of payload data for a plurality of features and peripheral functionality, where the pre-shipment token is validated and indicates a faultless operational status of the IoT device. There is further provided, responsive to establishing a connection between the IoT device and the logistic device, regenerating a token for the IoT device based on a second set of payload data to re-validate the plurality of features and peripheral functionality, where the regenerated token matches the pre-shipment token. There is further provided generating a plurality of tokens for the IoT device iteratively between the origin location and the target location. There is further provided, responsive to determining a first iteratively generated token from a plurality of iteratively generated tokens does not match the regenerated token, receiving data from the logistic device for a period of time between the first iteratively generated token and a prior iteratively generated token that matched the regenerated token. A technical advantage for the abovementioned aspect of the invention includes identifying faults to hardware of an IoT device through the utilization of tokens in a hashed or tokenized format for various inputs, outputs, and/or readings produced by the IoT device.

In embodiments, generating the pre-shipment token for the IoT device can comprise a computer-implemented method, computer program product, or a computer system for receiving the first set of payload data for the plurality of features and peripheral functionality of the IoT device and converting the first set of payload data for the plurality of features and peripheral functionality of the IoT device into the pre-shipment token. A technical advantage includes converting a large quantity of data (i.e., first set of payload data) into the pre-shipment token that is encrypted and comparable to subsequently generated tokens for identifying faults with the hardware of the IoT device.

In embodiments, the plurality of iteratively generated tokens are based on a plurality of sets of payload data for the plurality of features and peripheral functionality of the IoT device. A technical advantage includes multiple sets of large quantities of data (i.e., plurality of sets of payload data) which are utilized in the iterative generation of tokens to identify faults with the hardware of the IoT device.

In embodiments, validating the logistic device, the IoT device, and associated functionality of the IoT device can comprise a computer-implemented method, computer program product, or a computer system for identifying a first identification number for the logistic device, identifying a second identification number for the IoT device, and pairing the logistic device to the IoT device based on the first identification number and the second identification number for a duration of a shipment between the origin location and the target location. A technical advantage includes pairing the logistic device and the IoT device to prevent manipulation of the payload data and/or the tokens when identifying faults with the hardware of the IoT device.

In embodiments, the data from the logistic device includes additional information selected from the group consisting of: a plurality of accelerometer readings, a plurality of moisture levels, loading information, and unloading information. An advantage includes various information (i.e., data) for determining what resulted in the identified fault with the hardware of the IoT device.

In embodiments, provided is a computer-implemented method, computer program product, or a computer system for generating a final token for the IoT device based on a final set of payload data for the plurality of features and peripheral functionality, where the final token is validated and indicates the faultless operational status of the IoT device. An advantage includes utilizing a final token to identify there are no faults with the hardware of the IoT device and accepting delivery of the IoT device by a client.

In embodiments, provided is a computer-implemented method, computer program product, or a computer system for generating a final token for the IoT device based on a final set of payload data for the plurality of features and peripheral functionality, where the final token is not validated and indicates a faulty operational status of the IoT device. An advantage includes utilizing a final token to identify faults with the hardware of the IoT device and potentially rejecting a delivery of the IoT device by a client, resulting in reduced downtime due to the faulty IoT device not being installed at a client site.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as, logistic transport monitoring program 300. In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 300, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 300 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
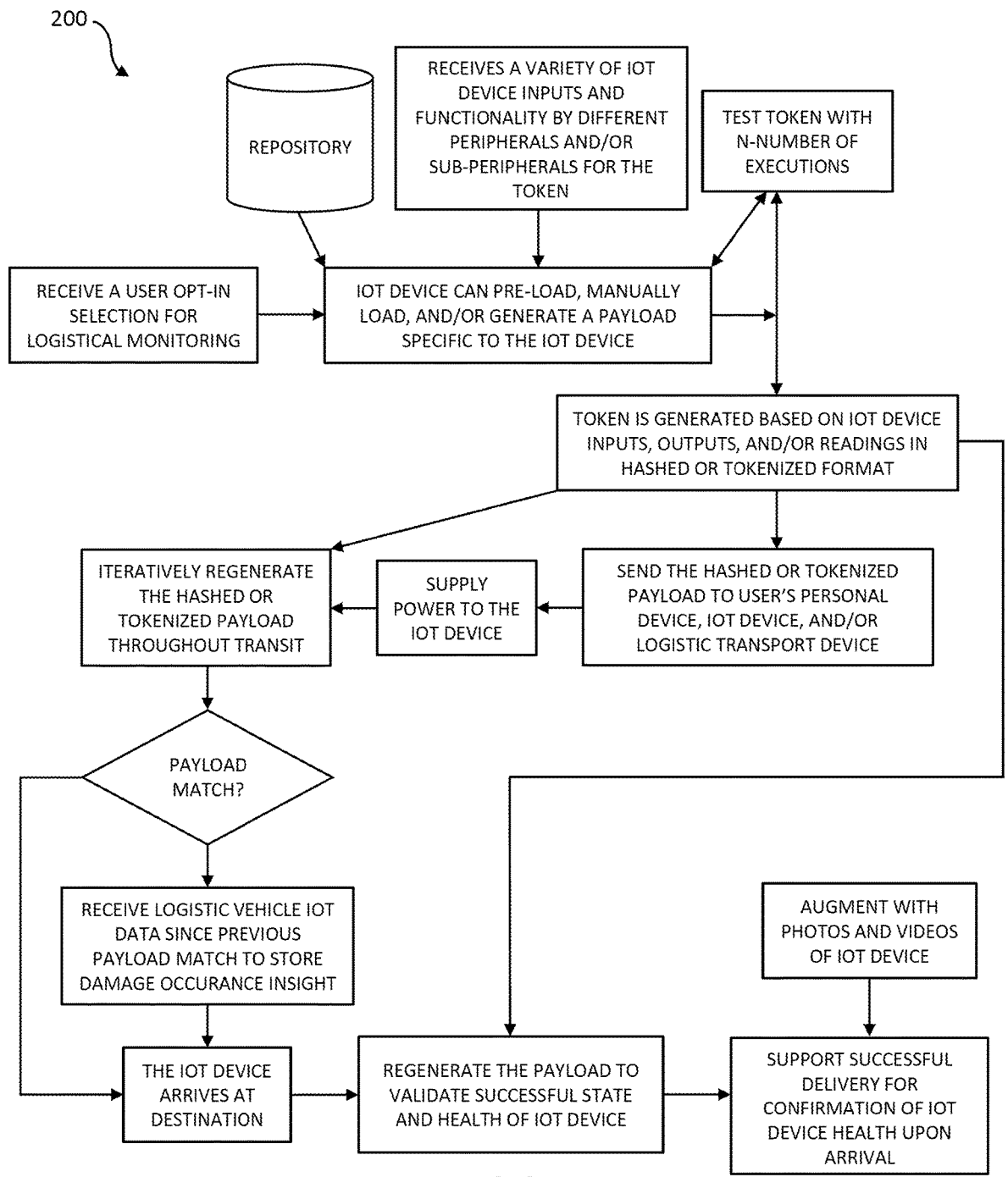
FIG. 2 depicts a process flow of logistic transport monitoring of IoT devices, in accordance with an embodiment of the present invention.

FIG. 2 depicts a process flow of logistic transport monitoring of IoT devices, in accordance with an embodiment of the present invention. Process flow 200 is an example of one embodiment for the logistic transport monitoring of IoT devices that includes steps performed by logistic transport monitoring program 300, discussed in further detail with regards to FIG. 3. Process flow 200 includes logistic transport monitoring program 300 receiving a user opt-in selection for logistic monitoring of an IoT device as it travels from an origin location to a target location. In one example, logistic transport monitoring program 300 operates as a service provided to a customer (i.e., a user) of a shipping carrier, where the user has an account with the shipping carrier and can select which shipment is to include logistic monitoring of an IoT device by enabling or disabling the feature. In another example, logistic transport monitoring program 300 operates as a service provided to a customer (i.e., a user) of a manufacturer of an IoT device, where the user purchased the IoT device utilizing an account with the manufacturer and the user can select whether to enable or disable logistic monitoring of the IoT device. Enabling or disabling the logistic monitoring of an IoT device through the user opt-in selection can also affect insurance and/or damage claims made by user. Upon receiving the user opt-in selection for logistical monitoring, process flow 200 includes the IoT device being pre-loaded, manually loaded, and/or a payload generated specific to the device. Logistic transport monitoring program 300 can pre-load, manually load, and/or generate a payload specific to the device to ensure consistent token generation during the subsequent iterative regeneration during the transit of the IoT device between the origin location and the target location.

Logistic transport monitoring program 300 can utilize a repository with IoT device specific payloads and receive a variety of IoT device inputs and functionality by different peripherals and/or sub-peripherals for the token to be generated for the IoT device. Logistic transport monitoring program 300 can pre-load a payload with previously defined parameters, along with previously defined inputs and functionality from different peripherals and/or sub-peripherals for the token to be generated for the IoT device. Logistic transport monitoring program 300 can manually load a payload by querying the user for the parameters, along with inputs and functionality from different peripherals and/or sub-peripherals for the token to be generated for the IoT device. By querying the user, logistic transport monitoring program 300 allows for the user to utilize a unique payload only known to the user, thus reducing a likelihood of maliciously replicating the parameters. Logistic transport monitoring program 300 can generate a payload specific to the IoT device by randomly generating parameters and a variety of IoT device inputs and functionalities by different peripherals and/or sub-peripherals for the token to be generated for the IoT device.

Process flow 200 further includes logistic transport monitoring program 300 generating a token based on the IoT device inputs, outputs, and/or readings (i.e., payload) in a hashed or tokenized format, where logistic transport monitoring program 300 tests the token with an n-number (e.g., 30) of executions to ensure the token is consistently replicable by the IoT device. In the event logistic transport monitoring program 300 determines that during the testing there is a deviation from the expected token (i.e., the generated token), logistic transport monitoring program 300 reverts back to pre-load, manually load, and/or generate another payload specific to the IoT device. Logistic transport monitoring program 300 generates a new token based on new inputs, outputs, and/or readings (i.e., payload) from the IoT device in the hashed or tokenized format, where logistic transport monitoring program 300 tests the new token with an n-number of executions to ensure the token is consistently replicable by the IoT device. In the event where logistic transport monitoring program 300 tests the token with the n-number (e.g., 30) of executions to ensure the token is consistently replicable by the IoT device and determines that during the testing there is no deviation from the expected token, process flow 200 can include logistic transport monitoring program 300 sending the hashed or tokenized payload to a user's personal device, IoT device, and/or logistic transport device.

As the IoT device is loaded onto a transporter (e.g., tractor trailer, shipping container), process flow 200 can include coupling the IoT device to an external power source to supply power to the IoT device or logistic transport monitoring program 300 instructing the IoT device to utilize an internal power source to supply power to a portion of the hardware required to generate the token. Logistic transport monitoring program 300 does not need to supply power to all of the hardware if certain hardware does not produce the inputs, outputs, and/or readings required to generate the token, therefore logistic transport monitoring program 300 can conserve energy by supplying power to the portion of the hardware required to generate the token. As the IoT device travels between the origin location and the target location, process flow 200 includes the IoT device iteratively regenerating a token as a hashed or tokenized payload throughout the transit and logistic transport monitoring program 300 receives the token as the hashed or tokenized payload to determine if the regenerated token by the IoT device matches the generated token at the origin location. The generated token by the IoT device represents an initial token to which logistic transport monitoring program 300 compares each of the iteratively regenerated tokens too. To maintain integrity of the token, the IoT device and logistic transport monitoring program 300 utilizes a hashed or tokenized payload to ensure none of the values can be altered and/or manipulated.

Process flow 200 further includes logistic transport monitoring program 300 determining whether the iteratively generated payload tokens match the generated payload token. If the IoT device is capable of transmitting the iteratively generated hashed or tokenized payload during transit, logistic transport monitoring program 300 can receive each iteratively generated hashed or tokenized payload at different points throughout the transit between the origin location and the target location. If the IoT device is not capable of transmitting the iteratively generated hashed or tokenized payload during transit, logistic transport monitoring program 300 can receive a batch of the iteratively generated hashed or tokenized payloads at different logistical hubs throughout the transit between the origin location and the target location. The different logistical hubs all for the IoT device to connect to a local network and transmit the batch of the iteratively generated hashed or tokenized payloads to logistic transport monitoring program 300. In the event logistic transport monitoring program 300 determines an iteratively generated payload token does not match the generated payload token, logistic transport monitoring program 300 receives logistic vehicle IoT data since a previous payload match to store damage occurrence insight. In the event logistic transport monitoring program 300 determines the iteratively generated payload token does match the generated payload token, the IoT device arrives at the destination (i.e., target location) and logistic transport monitoring program 300 regenerates the hashed or tokenized payload to validate a successful state and health of IoT device.

The regenerated hashed or tokenized payload to validate a successful state and health of the IoT device represents a final generated token for logistic transport monitoring program 300 to support a successful delivery for confirmation of IoT device health upon arrival. Though logistic transport monitoring program 300 can determine an iteratively generated payload token does not match the generated payload token, this does not necessarily indicate the IoT device is damaged. For example, the initial token generated based on IoT device inputs, outputs, and/or readings in the hashed or tokenized format can include an accelerometer reading outside of defined parameters, that might result in an iteratively regenerated token that does not match the initial generated token. Logistic transport monitoring program 300 regenerates the final token to determine if the accelerometer reading outside of the defined parameters affected the IoT device health (e.g., calibration error). Process flow 200 can further augment the confirmation of the IoT device health with photos and/or videos of the IoT device, where logistic transport monitoring program 300 receives the photos and/or videos of the IoT device that provide a visual inspection of the IoT device at the target location. In other embodiments, logistic transport monitoring program 300 can utilize an IoT device specific algorithm based on IoT device type (e.g., medical device, consumer entertainment) to generate the initial token, the iteratively regenerated tokens, and a final regenerated token, where logistic transport monitoring program 300 stores the IoT device specific algorithm in an open-source repository. Alternatively, logistic transport monitoring program 300 can assemble the IoT device specific algorithms into software development kits (SDKs) and integrate the algorithms into an operating system on the IoT device itself.

Figure 3:
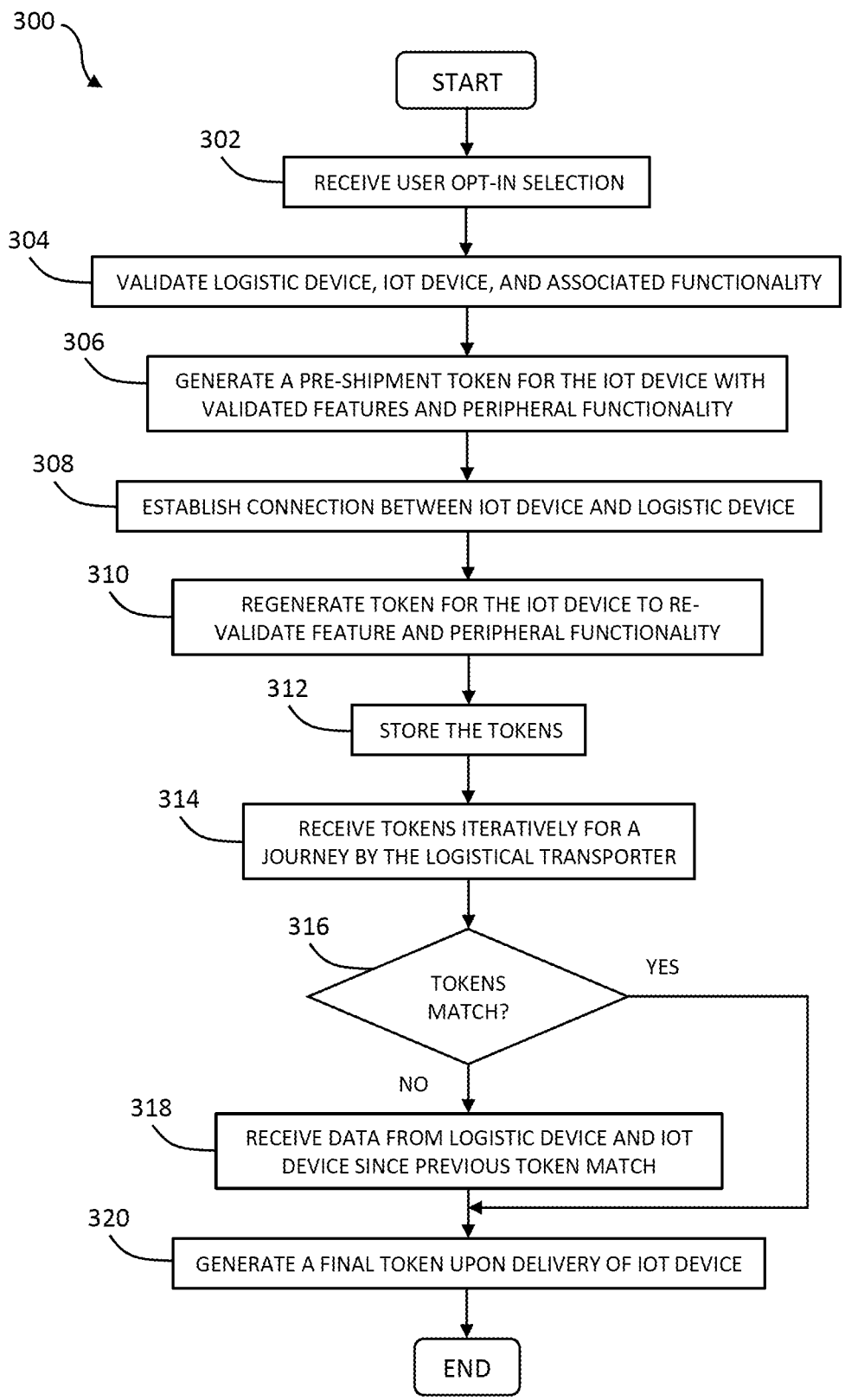
FIG. 3 depicts a flowchart of a logistic transport monitoring program for verification of operational functionality of IoT devices, in accordance with an embodiment of the present invention.

FIG. 3 depicts a flowchart of a logistic transport monitoring program for verification of operational functionality of IoT devices, in accordance with an embodiment of the present invention.

Logistic transport monitoring program 300 receives a user opt-in selection (302). For logistic transport monitoring program 300 to provide verification of operational functionality of an IoT device being shipped between an origin location and a target location, logistic transport monitoring program 300 receives the user opt-in selection for the IoT device. In one embodiment, logistic transport monitoring program 300 operates as a service provided to a customer (i.e., a user) of a shipping carrier handling the IoT device, where the user has an account with the shipping carrier and can select which shipment is to include logistic monitoring of the IoT device by enabling or disabling the feature. In another embodiment, logistic transport monitoring program 300 operates as a service provided to a customer (i.e., a user) of a manufacturer of an IoT device, where the user purchased the IoT device utilizing an account with the manufacturer and the user can select whether to enable or disable logistic monitoring of the IoT device. Enabling or disabling the logistic monitoring of an IoT device through the user opt-in selection can affect insurance and/or damage claims made by user against the shipping carrier and the manufacturer. In some embodiments, if logistic transport monitoring program 300 determines a monetary value of an IoT device being shipped exceeds a predetermined value (e.g., $1000) and/or is categorize in a specific type of IoT devices (e.g., medical devices), then logistic transport monitoring program 300 opts-in the user and the IoT device to provide the verification of operational of the IoT device being shipped.

Logistic transport monitoring program 300 validates a logistic device, the IoT device, and associated functionality (304). In this embodiment, the logistic device represents a module capable of receiving operational data from the IoT device, such as, input, output, and hardware parameter readings, where the logistic device is capable of communication with logistic transport monitoring program 300 via a communication network. In another embodiment, logistic device is not required, since the IoT device is capable of communicating with logistic transport monitoring program 300 via a communication network, where logistic transport monitoring program 300 receives the captured operational data from the IoT device without an intermediary device. Logistic transport monitoring program 300 validates the logistic device and the IoT device by identifying a first identification number (e.g., serial number) for the logistic device and a second identification number for the IoT device and pairing the first identification number to the second identification number for a duration of the shipment between the origin location and the target location. Logistic transport monitoring program 300 identifies the logistic device based on metadata for communication received from the logistic device, where the metadata includes the first identification number. Logistic transport monitoring program 300 can utilize the logistic device to identify the IoT device being shipped based on a media access control (MAC) address, IoT device name, IoT device model name, IoT device serial number, and/or other information capturable by the logistic device when communication with the IoT device. Based on the first identification number and the second identification number, logistic transport monitoring program 300 identifies associated functionality for the logistic device and the IoT device, respectively. Since the logistic device is associated with logistic transport monitoring program 300, all functionality for the logistic device is known (e.g., stored in a repository) based on the first serial number. For embodiments where a logistic device is not present, logistic transport monitoring program 300 communicates directly with the IoT device via a communication network (e.g., cloud-based server, cloud-based webservices) and validates the IoT device and associated functionality without the logistic device acting as the intermediary device.

Logistic transport monitoring program 300 generates a pre-shipment token for the IoT device with validated features and peripheral functionality (306). In this embodiment, logistic transport monitoring program 300 generates the pre-shipment token, also referred to as an initial token, in a hashed or tokenized format for runtime data and metrics from various peripherals and/or inputs and outputs of the IoT device. The runtime data and metrics from the various peripherals can include data points for volume, display, connectivity, and power capacity. Input and outputs of the IoT device can include one or more self-test procedures to ensure core functionality and tolerances are maintained. Logistic transport monitoring program 300 receives the runtime data and metrics from various peripherals and/or inputs and outputs of the IoT device and generates the pre-shipment token in the hashed or tokenized format by converting the runtime data and metrics for the plurality of features and peripheral functionality of the IoT device into the pre-shipment token. Prior to initializing the shipment, logistic transport monitoring program 300 tests the pre-shipment token by perform a predetermined number of executions (i.e., n-number) to ensure the pre-shipment token is replicable. A validated pre-shipment token indicates a faultless operational status of the IoT device. In the event logistic transport monitoring program 300 determines that during the testing there is a deviation from an expected token (i.e., the pre-determined token), logistic transport monitoring program 300 generates a new pre-shipment token utilizing different runtime data and metrics from the various peripherals and/or inputs and outputs of the IoT device. In the event where logistic transport monitoring program 300 tests the pre-shipment token with the n-number (e.g., 30) of executions to ensure the token is consistently replicable by the IoT device and determines that during the testing there is no deviation from the expected token, logistic transport monitoring program 300 can send the pre-shipment token or the IoT device to the user's client device, IoT device, and/or the logistic device. As previously discussed, logistic transport monitoring program 300 can receive the pre-shipment token as a hashed or tokenized payload to ensure none of the values can be altered and/or manipulated.

Logistic transport monitoring program 300 establish connection between the IoT device and the logistical transporter (308). In this embodiment, logistic transport monitoring program 300 connects the IoT device to the logistical transporter (e.g., tractor trailer, shipping container, cargo plane) via the logistic device, where logistic transport monitoring program 300 utilizes the logistic device to identify the IoT devices within the logistical transporter. Logistic transport monitoring program 300 can activate a local communication network of the logistic device to which the IoT device can connect and subsequentially communicate with via a wider communication network. The IoT device can be physically coupled to an external power source on the logistical transporter to supply power to the IoT device or logistic transport monitoring program 300 can instruct the IoT device, via the logistic device, to utilize an internal power source to supply power to a portion of the hardware required to generate the token. Logistic transport monitoring program 300 does not need to supply power to all of the hardware if certain hardware does not produce the inputs, outputs, and/or readings required to generate the token, therefore logistic transport monitoring program 300 can conserve energy by supplying power to the portion of the hardware required to generate the token.

Logistic transport monitoring program 300 regenerates the token for the IoT device to re-validate feature and peripheral functionality (310). In this embodiment, subsequent to the IoT device being loaded onto the transporter and logistic transport monitoring program 300 connecting to the IoT device, logistic transport monitoring program 300 regenerates the token for the IoT device to re-validate feature and peripheral functionality prior to leaving the origin location. Since there is an increased likelihood of damage to a shipment when handled during the loading and unloading portion of the logistical transporter, logistic transport monitoring program 300 ensures that the feature and peripheral functionality for the IoT device is maintained prior to the IoT device (i.e., shipment) leaving a logistical hub. In one embodiment, logistic transport monitoring program 300 can send a request to the IoT device, via the logistic device, to regenerate the token for the IoT device, where the request the identification number (i.e., the second identification number previously discussed above) for the IoT device on the transporter. In another embodiment, logistic transport monitoring program 300 can send a request directly to the IoT device. Logistic transport monitoring program 300 can receive, via the logistic device, the token from the IoT device to re-validate feature and peripheral functionality. In the event logistic transport monitoring program 300 determines the regenerated token matches the previously generated pre-shipment token, logistic transport monitoring program 300 takes no action and the shipment of the IoT device can leave the origin location to the target location. In the event logistic transport monitoring program 300 determines the regenerated token does not match the previously generated pre-shipment token, logistic transport monitoring program 300 can take one or more actions to prevent the shipment of the IoT device from leaving the origin location to the target location.

An example of an action can include logistic transport monitoring program 300 sending an alert to the shipping carrier to remove the IoT device (i.e., shipment) from the logistical transporter prior to departure from the origin location, where the alert includes the identification number (i.e., the second identification number previously discussed above) for the IoT device. Another example of an action can include logistic transport monitoring program 300 sending an alert to a user's client device indicating the regenerated token after loading of the IoT device onto the logistical transporter does not match the pre-shipment token for the IoT device. In yet another example of an action, logistic transport monitoring program 300 can activate an audible and/or visual alert on the logistic device to notify an employee of the shipping carrier loading the logistical transporter to remove the IoT device from the logistical transporter, wherein the audible and/or visual alert includes the identification number for the IoT device. In yet another example of an action, logistic transport monitoring program 300 can activate an audible and/or visual alert on the IoT device itself to notify an employee of the shipping carrier loading the logistical transporter to remove the IoT device from the logistical transporter. As previously discussed, logistic transport monitoring program 300 can receive the regenerated token as a hashed or tokenized payload to ensure none of the values can be altered and/or manipulated. It is to be noted that a validated regenerated token will match the pre-shipment token that logistic transport monitoring program 300 previously generated in (308).

Logistic transport monitoring program 300 stores the tokens (312). In the embodiment, logistic transport monitoring program 300 stores the tokens, including the pre-shipment token and the regenerated token, in a remote repository accessible by the user. In other embodiments, logistic transport monitoring program 300 stores the tokens, including the pre-shipment token and the regenerated token, on the IoT device itself, the logistic device, and/or a user's client device. Logistic transport monitoring program 300 associates the pre-shipment token and the regenerated token with the IoT device and a specific shipment number (e.g., tracking number) and can utilize the pre-shipment token and the regenerated token for future shipments of similar IoT devices. For example, if the IoT device is a smart television model number 1234, logistic transport monitoring program 300 can validate the same features and peripheral functionality for smart television model 1234 being handled by the shipping carrier. Logistic transport monitoring program 300 can continuously update the remote repository with a list of which features and peripheral functionality are to be validates for new IoT devices being shipped.

Logistic transport monitoring program 300 receives tokens iteratively for a journey by the logistical transporter (314). As the IoT device travels between the origin location and the target location through a logistical network, logistic transport monitoring program 300 instructs the IoT device to iteratively generate tokens to validate the features and peripheral functionality. In one embodiment, logistic transport monitoring program 300 instructs the IoT device to iteratively generate tokens at set time intervals (e.g., 1 hour) while traveling between the origin location and the target location and logistic transport monitoring program 300 receives the iteratively generated tokens. In another embodiment, logistic transport monitoring program 300 instructs the IoT device to iteratively generate tokens upon the IoT device arriving at a logistical hub, where the IoT device is handled, and the identification number is scanned for the shipment. In yet another embodiment, a user of logistic transport monitoring program 300 can instruct the IoT device to generate the token outside of the iterative generation of tokens if the user wants to see a current feature and peripheral functionality state of the IoT device. As previously discussed, the IoT device can utilize an external power source associated with the logistic device and the logistical transporter or an internal power source to generate the token to validate feature and peripheral functionality. To conserve power, the IoT device can operate in a low power mode, where not all the hardware and/or software is active on the IoT device. Logistic transport monitoring program 300 can awake the IoT device and instruct portions of the hardware and/or software required to generate the token to validate features and peripheral functionality. Subsequently, logistic transport monitoring program 300 can receive the iteratively generated token. As previously discussed, logistic transport monitoring program 300 can receive the iteratively generate token as a hashed or tokenized payload to ensure none of the values can be altered and/or manipulated.

Logistic transport monitoring program 300 determines whether the iteratively generated tokens match the regenerated token (decision 316). In the event logistic transport monitoring program 300 determines an iteratively generated token does not match the regenerated token ("no" branch, decision 316), logistic transport monitoring program 300 receives data from the logistic device and the IoT device since the previous token match (318). In the event logistic transport monitoring program 300 determines the iteratively generated token does match the regenerated token ("no" branch, decision 316), logistic transport monitoring program 300 generates a final token upon delivery of the IoT device (320).

As previously discussed, the regenerated token represents the token that IoT device generated subsequent to being loaded onto the logistical transporter, but prior to starting the journey between the origin location and the target location. In one embodiment, logistic transport monitoring program 300 receives, via a communications network, each of the iteratively tokens as they are generated and determines whether the received iteratively generated token matches the regenerated token. If the iteratively generated token matches the regenerated token, logistic transport monitoring program 300 validates the iteratively generated token and logistic transport monitoring program 300 determines no fault is present with the IoT device feature and peripheral functionality (i.e., not damaged). If the iteratively generated token does match the regenerated token, logistic transport monitoring program 300 does not validate the iteratively generated token and logistic transport monitoring program 300 determines a fault is present with the IoT device feature and peripheral functionality (i.e., damaged). In another embodiment, logistic transport monitoring program 300 receives all of the iteratively tokens in a batch upon arrival to a logistical hub and/or target location, where the IoT device and/or the logistic device can establish a connection to local communications network. Subsequent to receiving the batch of iteratively generated tokens by the IoT device, logistic transport monitoring program 300 determines whether each iteratively generated tokens from the batch of iteratively generated tokens matches the regenerated token. If each of the iteratively generated token from the batch of iteratively generated tokens matches the regenerated token, logistic transport monitoring program 300 validates the batch of iteratively generated tokens and logistic transport monitoring program 300 determines no fault is present with the IoT device feature and peripheral functionality (i.e., not damaged). If at least one iteratively generated token from the batch of iteratively generated tokens does match the regenerated token, logistic transport monitoring program 300 does not validate the iteratively generated token and logistic transport monitoring program 300 determines a fault is present with the IoT device feature and peripheral functionality (i.e., damaged).

Logistic transport monitoring program 300 receives data from the logistic device and the IoT device since the previous token match (318). Due to logistic transport monitoring program 300 detecting a mismatch between at least one iteratively generated token and the regenerated token, logistic transport monitoring program 300 can query the IoT device, the logistic device, and/or other IoT devices on the logistic transporter for additional information. The other IoT devices on the logistic transporter represent other devices for which user opt-in selections were received, where logistic transport monitoring program 300 can utilize iterative tokens generated from the other IoT devices to see if any other IoT device failed to validate on the logistic transporter. The additional information that logistic transport monitoring program 300 receives can include accelerometer readings, moisture levels, loading information, and unloading information. In some embodiments, where logistic transport monitoring program 300 receives the iteratively generated token from the IoT device via the logistic device, logistic transport monitoring program 300 can receive the iteratively generated token with the additional information appended. Alliteratively, in some embodiments logistic transport monitoring program 300 receives the additional information directly from the IoT device and/or the logistic device.

In one example, logistic transport monitoring program 300 receives accelerator readings from the logistic device indicating that a value fell outside of a predefined range a time between two iteratively generated tokens, where the early of the two iteratively generated tokens was validated and the later of the two iteratively generated tokens was not generated. Logistic transport monitoring program 300 also receives iteratively generated tokens from multiple IoT devices on the logistical transporter, where at least one other IoT device from the multiple IoT device included an iteratively generated token that was not validated by logistic transport monitoring program 300. Logistic transport monitoring program 300 can send the additional information to a user's client device that is monitoring the IoT device as it travels between the origin location and the target location. Logistic transport monitoring program 300 receives the data with the additional information for a period of time between a most recent validated iteratively generated token and the iteratively generated token that was not validated, to reduce an amount of data that logistic transport monitoring program 300 receives from the IoT device, the logistic device, and/or the other IoT devices on the logistical transporter.

Logistic transport monitoring program 300 generates a final token upon delivery of the IoT device (320). Subsequent to arrival at the target location, logistic transport monitoring program 300 instructs the IoT device to generate a final token for successful offloading of the logistical transporter and to validate feature and peripheral functionality at the target location. If logistic transport monitoring program 300 determines the final token matches the regenerated token from (310), logistic transport monitoring program 300 determines the IoT device is successfully delivered and the IoT device with the features and peripherals functionalities include a faultless operational status. If logistic transport monitoring program 300 determines the final token does not match the regenerated token from (310), logistic transport monitoring program 300 determines the IoT device was not successfully delivered and the IoT device with the features and peripherals functionalities include a faulty operational status. It is to be noted that logistic transport monitoring program 300 can fail to validate (i.e., match) an iteratively generated token to the regenerated token from (310), but can validate the final token to the regenerated token from (310). Alternatively, logistic transport monitoring program 300 can validate the iteratively generated tokens to the regenerated toke from (310), but can fail to validate the final token to the regenerated token from (310). In some embodiments, logistic transport monitoring program 300 can augment and detect physical damage of the IoT device with one or more camera and/or video feeds of the cargo hold, loading area, and exterior of the logistic transporter.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    validating a logistic device, an IoT device, and associated functionality of the IoT device, wherein the IoT device is being shipped between an origin location and a target location;
    generating a pre-shipment token for the IoT device based on a first set of payload data for a plurality of features and peripheral functionality, wherein the pre-shipment token is validated and indicates a faultless operational status of the IoT device;
    responsive to establishing a connection between the IoT device and the logistic device, regenerating a token for the IoT device based on a second set of payload data to re-validate the plurality of features and peripheral functionality, wherein the regenerated token matches the pre-shipment token;
    generating a plurality of tokens for the IoT device iteratively between the origin location and the target location; and
    responsive to determining a first iteratively generated token from a plurality of iteratively generated tokens does not match the regenerated token, receiving data from the logistic device for a period of time between the first iteratively generated token and a prior iteratively generated token that matched the regenerated token.

2. The computer-implemented method of claim 1, wherein generating the pre-shipment token for the IoT device further comprises:
    receiving the first set of payload data for the plurality of features and peripheral functionality of the IoT device; and
    converting the first set of payload data for the plurality of features and peripheral functionality of the IoT device into the pre-shipment token.

3. The computer-implemented method of claim 1, wherein the plurality of iteratively generated tokens are based on a plurality of sets of payload data for the plurality of features and peripheral functionality of the IoT device.

4. The computer-implemented method of claim 1, wherein validating the logistic device, the IoT device, and associated functionality of the IoT device, further comprises:
    identifying a first identification number for the logistic device;
    identifying a second identification number for the IoT device; and
    pairing the logistic device to the IoT device based on the first identification number and the second identification number for a duration of a shipment between the origin location and the target location.

5. The computer-implemented method of claim 1, wherein the data from the logistic device includes additional information selected from the group consisting of: a plurality of accelerometer readings, a plurality of moisture levels, loading information, and unloading information.

6. The computer-implemented method of claim 1, further comprising:
    generating a final token for the IoT device based on a final set of payload data for the plurality of features and peripheral functionality, wherein the final token is validated and indicates the faultless operational status of the IoT device.

7. The computer-implemented method of claim 1, further comprising:
generating a final token for the IoT device based on a final set of payload data for the plurality of features and peripheral functionality, wherein the final token is not validated and indicates a faulty operational status of the IoT device.

8. A computer program product comprising:
one or more computer-readable storage media;
program instructions, stored on at least one of the one or more storage media, to validate a logistic device, an IoT device, and associated functionality of the IoT device, wherein the IoT device is being shipped between an origin location and a target location;
program instructions, stored on at least one of the one or more storage media, to generate a pre-shipment token for the IoT device based on a first set of payload data for a plurality of features and peripheral functionality, wherein the pre-shipment token is validated and indicates a faultless operational status of the IoT device;
program instructions, stored on at least one of the one or more storage media, responsive to establishing a connection between the IoT device and the logistic device, to regenerate a token for the IoT device based on a second set of payload data to re-validate the plurality of features and peripheral functionality, wherein the regenerated token matches the pre-shipment token;
program instructions, stored on at least one of the one or more storage media, to generate a plurality of tokens for the IoT device iteratively between the origin location and the target location; and
program instructions, stored on at least one of the one or more storage media, responsive to determining a first iteratively generated token from a plurality of iteratively generated tokens does not match the regenerated token, to receive data from the logistic device for a period of time between the first iteratively generated token and a prior iteratively generated token that matched the regenerated token.

9. The computer program product of claim 8, wherein program instructions, stored on at least one of the one or more storage media, to generate the pre-shipment token for the IoT device further comprises:
program instructions, stored on at least one of the one or more storage media, to receive the first set of payload data for the plurality of features and peripheral functionality of the IoT device; and
program instructions, stored on at least one of the one or more storage media, to convert the first set of payload data for the plurality of features and peripheral functionality of the IoT device into the pre-shipment token.

10. The computer program product of claim 8, wherein the plurality of iteratively generated tokens are based on a plurality of sets of payload data for the plurality of features and peripheral functionality of the IoT device.

11. The computer program product of claim 8, wherein program instructions, stored on at least one of the one or more storage media, to validate the logistic device, the IoT device, and associated functionality of the IoT device, further comprises:
program instructions, stored on at least one of the one or more storage media, to identify a first identification number for the logistic device;
program instructions, stored on at least one of the one or more storage media, to identify a second identification number for the IoT device; and
program instructions, stored on at least one of the one or more storage media, to pair the logistic device to the IoT device based on the first identification number and the second identification number for a duration of a shipment between the origin location and the target location.

12. The computer program product of claim 8, wherein the data from the logistic device includes additional information selected from the group consisting of: a plurality of accelerometer readings, a plurality of moisture levels, loading information, and unloading information.

13. The computer program product of claim 8, further comprising:
program instructions, stored on at least one of the one or more storage media, to generate a final token for the IoT device based on a final set of payload data for the plurality of features and peripheral functionality, wherein the final token is validated and indicates the faultless operational status of the IoT device.

14. The computer program product of claim 8, further comprising:
program instructions, stored on at least one of the one or more storage media, to generate a final token for the IoT device based on a final set of payload data for the plurality of features and peripheral functionality, wherein the final token is not validated and indicates a faulty operational status of the IoT device.

15. A computer system comprising:
one or more processors, one or more computer-readable memories and one or more computer-readable storage media;
program instructions, stored on at least one of the one or more storage media for execution by at least one of the one or more processors via at least one of the one or more memories, to validate a logistic device, an IoT device, and associated functionality of the IoT device, wherein the IoT device is being shipped between an origin location and a target location;
program instructions, stored on at least one of the one or more storage media for execution by at least one of the one or more processors via at least one of the one or more memories, to a pre-shipment token for the IoT device based on a first set of payload data for a plurality of features and peripheral functionality, wherein the pre-shipment token is validated and indicates a faultless operational status of the IoT device;
program instructions, stored on at least one of the one or more storage media for execution by at least one of the one or more processors via at least one of the one or more memories, responsive to establishing a connection between the IoT device and the logistic device, to regenerate a token for the IoT device based on a second set of payload data to re-validate the plurality of features and peripheral functionality, wherein the regenerated token matches the pre-shipment token;
program instructions, stored on at least one of the one or more storage media for execution by at least one of the one or more processors via at least one of the one or more memories, to generate a plurality of tokens for the IoT device iteratively between the origin location and the target location; and
program instructions, stored on at least one of the one or more storage media for execution by at least one of the one or more processors via at least one of the one or more memories, responsive to determining a first iteratively generated token from a plurality of iteratively generated tokens does not match the regenerated token, to receive data from the logistic device for a period of time between the first iteratively generated token and a prior iteratively generated token that matched the regenerated token.

16. The computer system of claim 15, wherein program instructions, stored on at least one of the one or more storage media for execution by at least one of the one or more processors via at least one of the one or more memories, to generate the pre-shipment token for the IoT device further comprises:
program instructions, stored on at least one of the one or more storage media for execution by at least one of the one or more processors via at least one of the one or more memories, to receive the first set of payload data for the plurality of features and peripheral functionality of the IoT device; and
program instructions, stored on at least one of the one or more storage media for execution by at least one of the one or more processors via at least one of the one or more memories, to convert the first set of payload data for the plurality of features and peripheral functionality of the IoT device into the pre-shipment token.

17. The computer system of claim 15, wherein the plurality of iteratively generated tokens are based on a plurality of sets of payload data for the plurality of features and peripheral functionality of the IoT device.

18. The computer system of claim 17, wherein program instructions, stored on at least one of the one or more storage media for execution by at least one of the one or more processors via at least one of the one or more memories, to validate the logistic device, the IoT device, and associated functionality of the IoT device, further comprises:
program instructions, stored on at least one of the one or more storage media for execution by at least one of the one or more processors via at least one of the one or more memories, to identify a first identification number for the logistic device;
program instructions, stored on at least one of the one or more storage media for execution by at least one of the one or more processors via at least one of the one or more memories, to identify a second identification number for the IoT device; and
program instructions, stored on at least one of the one or more storage media for execution by at least one of the one or more processors via at least one of the one or more memories, to pair the logistic device to the IoT device based on the first identification number and the second identification number for a duration of a shipment between the origin location and the target location.

19. The computer system of claim 15, wherein the data from the logistic device includes additional information selected from the group consisting of: a plurality of accelerometer readings, a plurality of moisture levels, loading information, and unloading information.

20. The computer system of claim 15, further comprising:
program instructions, stored on at least one of the one or more storage media for execution by at least one of the one or more processors via at least one of the one or more memories, to generate a final token for the IoT device based on a final set of payload data the plurality of features and peripheral functionality, wherein the final token is validated and indicates the faultless operational status of the IoT device.

* * * * *